United States Patent
Huang et al.

(10) Patent No.: US 9,596,000 B2
(45) Date of Patent: Mar. 14, 2017

(54) METHOD FOR SELECTING OPTIMAL CENTRAL CONTROLLER IN POWER LINE NETWORK

(71) Applicant: D-Link Corporation, Taipei (TW)

(72) Inventors: Jun-Hao Huang, Taipei (TW); Wei-Chung Hsu, Taipei (TW); Ming-Han Liu, Taipei (TW)

(73) Assignee: D-LINK CORPORATION, Taipei (TW)

( * ) Notice: Subject to any disclaimer, the term of this patent is extended or adjusted under 35 U.S.C. 154(b) by 792 days.

(21) Appl. No.: 14/024,719

(22) Filed: Sep. 12, 2013

(65) Prior Publication Data
US 2014/0358313 A1 Dec. 4, 2014

(30) Foreign Application Priority Data
May 31, 2013 (TW) .............................. 102119305 A

(51) Int. Cl.
*H04B 3/54* (2006.01)
(52) U.S. Cl.
CPC ....... *H04B 3/54* (2013.01); *H04B 2203/5445* (2013.01)
(58) Field of Classification Search
CPC .......................... H04B 3/54; H04B 2203/5445
USPC .......................... 700/286, 297, 298; 370/254
See application file for complete search history.

(56) References Cited

U.S. PATENT DOCUMENTS

| 5,787,080 A * | 7/1998 | Hulyalkar .......... H04Q 11/0478 370/310.2 |
| 2004/0174829 A1* | 9/2004 | Ayyagari ................ H04L 45/04 370/254 |

FOREIGN PATENT DOCUMENTS

CN 201450515 * 5/2010

* cited by examiner

*Primary Examiner* — Christopher E Everett
(74) *Attorney, Agent, or Firm* — Bacon & Thomas, PLLC

(57) ABSTRACT

The present invention is to provide a method for selecting the optimal central controller in a power line network, which is applicable to the power line network including at least one terminal device, at least one network device and a plurality of controllers. The controllers are respectively installed with a central controller evaluation and selection software and connected to the terminal device and/or network device, and can communicate with one other through power line. The method is performed by a central controller, that is determined by negotiation between the controllers, via the software and includes the steps of detecting and calculating the connected states of the controllers in the power line network; selecting the optimal controller according to the connected states, assigning the optimal controller as new central controller, and notifying the new central controller to the other controllers, so as to optimize the performance of the power line network.

10 Claims, 4 Drawing Sheets

METHOD FOR SELECTING OPTIMAL CENTRAL CONTROLLER IN POWER LINE NETWORK

FIELD OF THE INVENTION

The present invention relates to a method for selecting the optimal central controller in a power line network, which is applicable to the power line network including at least one terminal device, at least one network device and a plurality of controllers, such that a central controller determined by negotiation between the controllers is able to utilize a central controller evaluation and selection software installed therein to detect and calculate the connected states of the controllers in the power line network, select the optimal controller according to the connected states, assign the optimal controller as a new central controller, and notify the new central controller to the other controllers, for optimizing the performance of the power line network.

BACKGROUND OF THE INVENTION

With the increasingly extensive use of network technologies, a great variety of networking devices have been developed to suit user needs. For example, one who needs frequent use of broadband services may require an Asymmetric Digital Subscriber Line (ADSL) modem coupled to a central office (CO) line or a cable modem coupled to a TV signal cable in order to make Internet connection. As wireless network technologies gradually mature, cable-based broadband Internet connection has given way to the wireless version by degrees, not only because the latter can be implemented with far less cables than required in the former, but also because one who has made such wireless connection through an electronic device is allowed to move about freely. However, despite the huge convenience it brings to network applications, wireless broadband Internet connection has such drawbacks as low data security and high susceptibility to interruption. To overcome these drawbacks while maintaining the advantage of not requiring additional network cables, the power line communication (PLC) technology was devised and is now available for use. Generally speaking, a power line networking device is advantageous over modems and like networking devices in that it does not require extra cabling work, provides wide network coverage, allows easy connection, and has high data rate. In fact, a power line networking device relies on no more than a household power line to make broadband Internet connection. Therefore, a client end only has to plug a power line networking device to a wall socket, and broadband Internet connection can be established directly through the power line; in other words, there is no need for a broadband network service provider to install additional wires at the client end.

Currently, the major PLC standards are HomePlug AV and G.hn, both of which specify signal transmission via existing wires in a house so that no extra wiring is needed—a chief advantage of PLC over the conventional wired networking methods. In addition, data transmission through power lines will not be hindered by concrete walls or human bodies and therefore features higher stability and less delay than through the conventional wireless networks. In a power line network, it is necessary to choose a certain machine as the central controller, which in the HomePlug AV standard is referred to as the Central Coordinator (CCo), and in the G.hn standard as the Domain Master (DM). The central controller servers to organize the entire power line network, keep the data of the nodes in the power line group, and arrange the order of data transmission. A good central controller is one capable of effectively increasing the efficiency of the power line network and the number of supported nodes in the group. Recently, the trend of digital homes has caused such an increase in the demand for HD video, IP cam, and home automation that it is not uncommon for a house to be equipped with multiple PLC adapters. In order to achieve a balance between the performance and power consumption of products, the number of nodes in a power line group, and, last but not least, costs, it is important to be able to effectively and accurately select the optimal central controller for controlling the entire power line network.

As stated above, a power line network provides relatively stable signal transmission due to the fact that signals are transmitted through physical lines. During signal transmission, however, the data rate may drop because the various parts of the power line network are very likely to be affected by the phases of electricity and the noise of other electrical appliances, depending on the arrangement of power lines and the relative positions of such other electrical appliances. Besides, old wire taps and old wires may also compromise signal transmission efficiency. Therefore, the selection of the central controller should take into account the user's practical needs, the number of nodes each controller in the power line network can support, and the efficiency of connection between each controller and other controllers, among other factors. Only when the central controller is so selected can the performance of the power line network be optimized. Nevertheless, the existing mechanism for selecting the central controller in a power line network is merely to preset the controller that is first turned on as the central controller, without any optimization measures taken to deal with the actual network state. Hence, if the controller that is first turned on is a product of relatively low-end specifications, the number of supported nodes in the network will be relatively small, thus compromising network performance. If the controller that is first turned on is located where significant attenuation tends to occur and where there is strong interference, the stability of signal transmission through the power line network may be reduced.

In a nutshell, a conventional power line network is in want of a mechanism for selecting the optimal central control according to the actual network state and is therefore subject to compromised network performance and unstable signal transmission. The issue to be addressed by the present invention is to design a method for selecting the optimal central controller in a power line network so that the performance of the power line network can be automatically and effectively optimized.

BRIEF SUMMARY OF THE INVENTION

In view of the aforesaid drawbacks of the conventional power line networks, the inventor of the present invention incorporated years of practical experience in the related industry and long-term observation results into extensive research and experiment and finally succeeded in developing a method for selecting the optimal central controller in a power line network. The method is intended to solve the various problems of the conventional power line networks and thereby enable optimized performance of a power line network.

It is an object of the present invention to provide a method for selecting the optimal central controller in a power line network. The method is applicable to a power line network which includes at least one terminal device (e.g., a computer, a television set, a web camera, or a refrigerator), at least one network device (e.g., a router or a modem), and a plurality of controllers. The controllers, which are respectively connectable to the terminal device and/or the network device, are electrically connected by at least one power line so that the controllers can communicate with one other through the power line. In addition, each controller is installed with a central controller evaluation and selection software. When the power line network is formed, a central controller (i.e., the Central Coordinator defined in HomePlug AV or the Domain Master defined in G.hn) is determined by negotiation between the controllers, wherein the central controller can be any of the controllers and can execute the central controller evaluation and selection software. The method includes the following steps to be performed by the central controller via the central controller evaluation and selection software. To begin with, the central controller detects and calculates the connected states (e.g., the largest number of nodes each controller can support, the number of nodes which correspond to each controller and are defined by the controllers directly connected thereto, or the data rate between each controller and other controllers) of the controllers in the power line network. Next, the central controller selects the optimal controller according to the connected states, assigns the optimal controller as the central controller, and notifies the other controllers that the optimal controller now serves as the central controller. Thus, when a new controller is added to the power line network and thereby changes the number of nodes in the power line network, the central controller will re-evaluate the existing controllers in the power line network and once again select the optimal controller as the central controller. Or, when the central controller is removed from the power line network, the controllers remaining in the power line network will re-negotiate with one another to determine a new central controller, so as for the new central controller to select the optimal controller as the central controller, with a view to optimizing the performance of the power line network.

BRIEF DESCRIPTION OF THE SEVERAL VIEWS OF THE DRAWINGS

The objects, technical features and effects of the present invention will be best understood by referring to the following detailed description of some illustrative embodiments in conjunction with the accompanying drawings, in which.

DETAILED DESCRIPTION OF THE INVENTION

Figure 1:
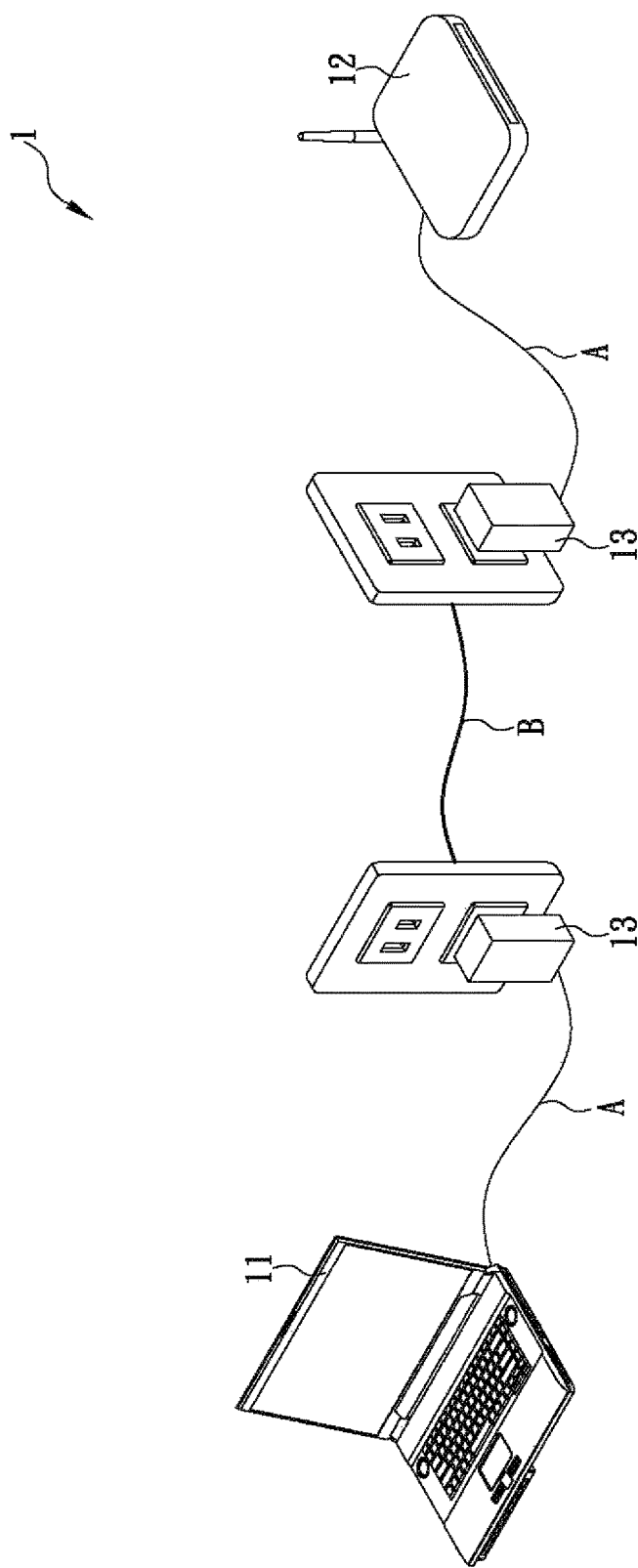
FIG. 1 schematically shows a simplified structure of a power line network.

The present invention discloses a method for selecting the optimal central controller in a power line network. Referring to FIG. 1, the method is applied to a power line network 1, wherein the power line network 1 includes at least one terminal device 11, at least one network device 12, and a plurality of controllers 13. In the schematic drawing of FIG. 1, the terminal device 11 is a laptop computer, but the terminal device 11 is not limited thereto in practice. Given the current development trend of digital homes, the terminal device 11 can be any electrical appliance that is controllable through a network, such as a television set, web camera, or refrigerator. The network device 12, on the other hand, can be a router, modem, or the like, through which the power line network 1 can connect to the Internet. The controllers 13 are respectively connectable to the terminal device 11 and/or the network device 12. As shown in FIG. 1, the controllers 13 are connected to the terminal device 11 and the network device 12 through two network cables A respectively. Besides, the controllers 13 are electrically connected via at least one power line B so that not only can the controllers 13 communicate with each other through the power line B, but also the terminal device 11 and the network device 12 can transmit data to each other through the controllers 13 and the power line B.

Figure 2:
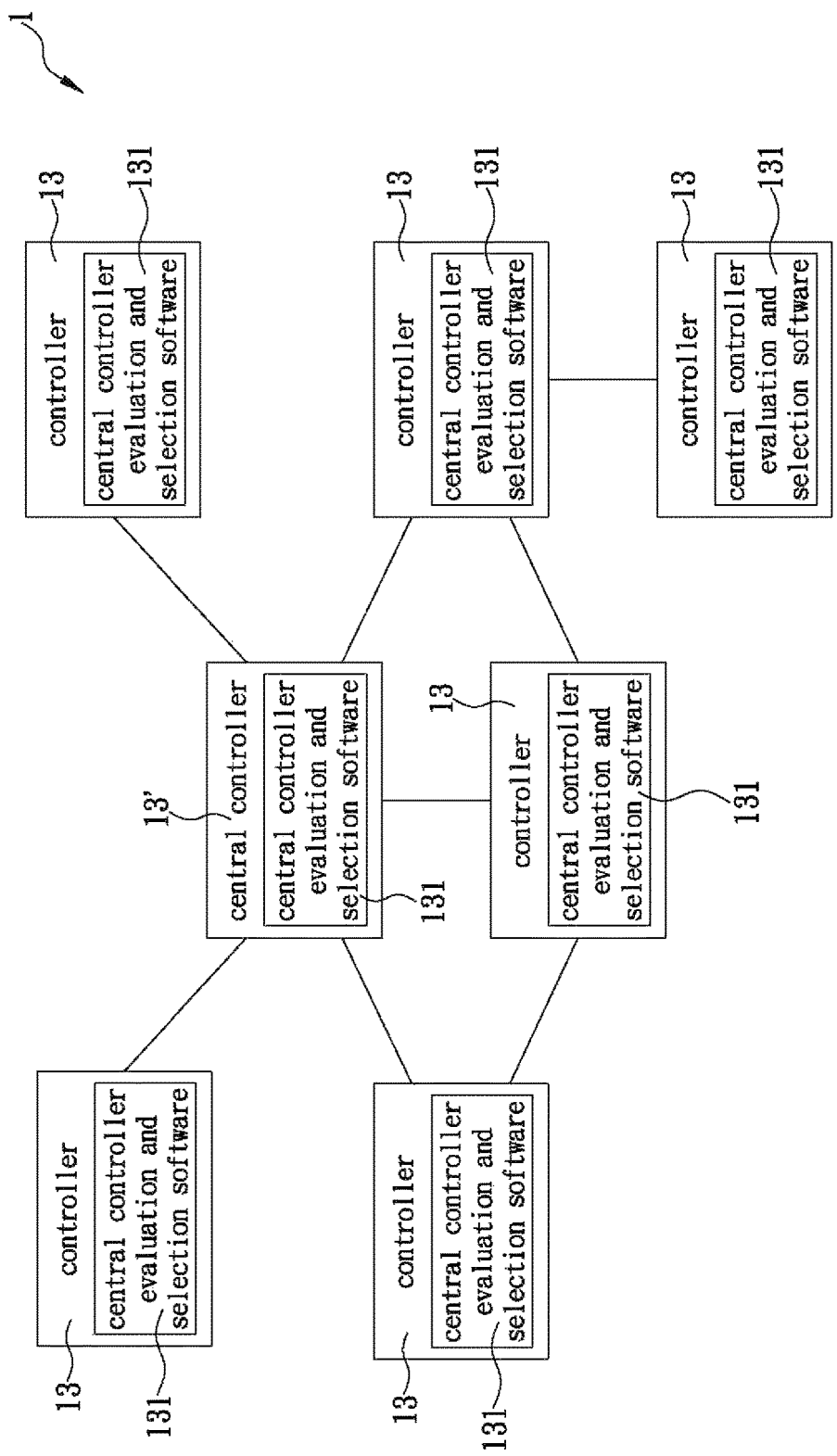
FIG. 2 schematically shows how controllers are connected in a power line network.

Referring to FIG. 2, each controller 13 is installed with a central controller evaluation and selection software 131. When the power line network 1 is formed, the controllers 13 negotiate with one another to determine a central controller 13' (i.e., the Central Coordinator in HomePlug AV or the Domain Master in G.hn), wherein the central controller 13' can be any of the controllers 13. For instance, it can be preset that the first controller 13 turned on in the course where the power line network 1 is formed is the central controller 13'. Alternatively, the controllers 13 sequentially send out discover beacons after the power line network 1 is formed, and by doing so, each controller 13 obtains the network topology of the power line network 1. Then, one of the controllers 13 in the power line network 1 is selected as the central controller 13'. Once a controller 13 becomes the central controller 13', it can execute the central controller evaluation and selection software 131 and thereby perform the following steps of the method of the present invention. First of all, the central controller 13' detects and calculates the connected states of the controllers 13 in the power line network 1. The term "connected state" refers to such parameter conditions as "the largest number of nodes each controller 13 can support", "the number of nodes which correspond to each controller 13 and are defined by the controllers 13 directly connected thereto" or "the data rate between each controller 13 and other controllers 13". The central controller evaluation and selection software 131 stores a plurality of parameter conditions so that the central controller 13' can, according to the parameter conditions stored in the central controller evaluation and selection software 131, detect and calculate the largest number of nodes each controller 13 in the power line network 1 can support; or the central controller 13' can, according to the parameter conditions stored in the central controller evaluation and selection software 131, detect and calculate the number of nodes which correspond to each controller 13 and are defined by the controllers 13 directly connected thereto; or the central controller 13' can, by means of the central controller evaluation and selection software 131, detect and calculate the data rate between the controllers 13; or the central controller 13' can, by means of the central controller evaluation and selection software 131, detect and calculate parameter conditions other than those mentioned above. Then, based on the aforesaid parameter conditions, the central controller 13' selects the optimal controller 13 through the central controller evaluation and selection software 131.

Figure 3:
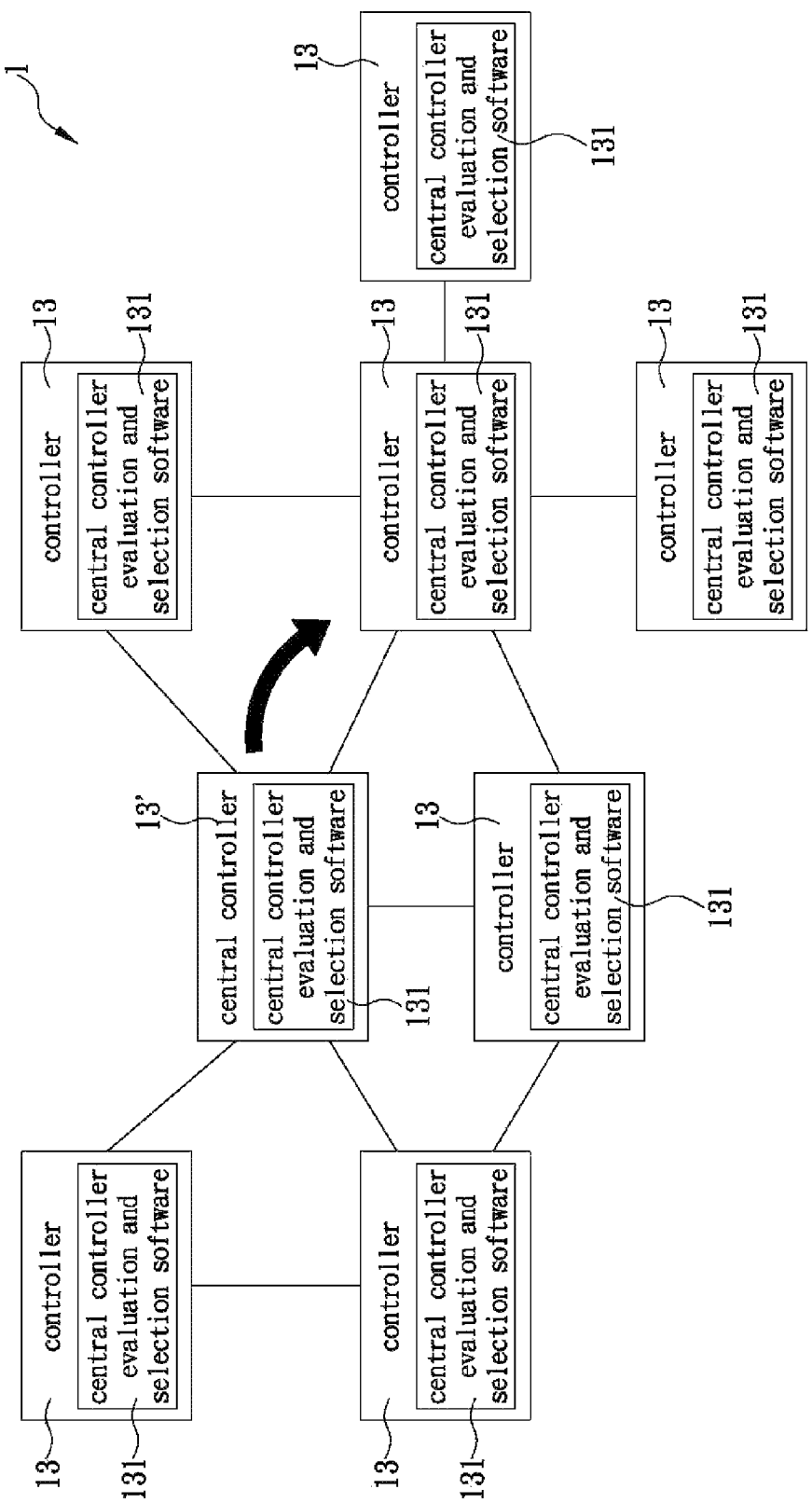
FIG. 3 schematically shows a controller being added to the power line network of FIG. 2.
Figure 4:
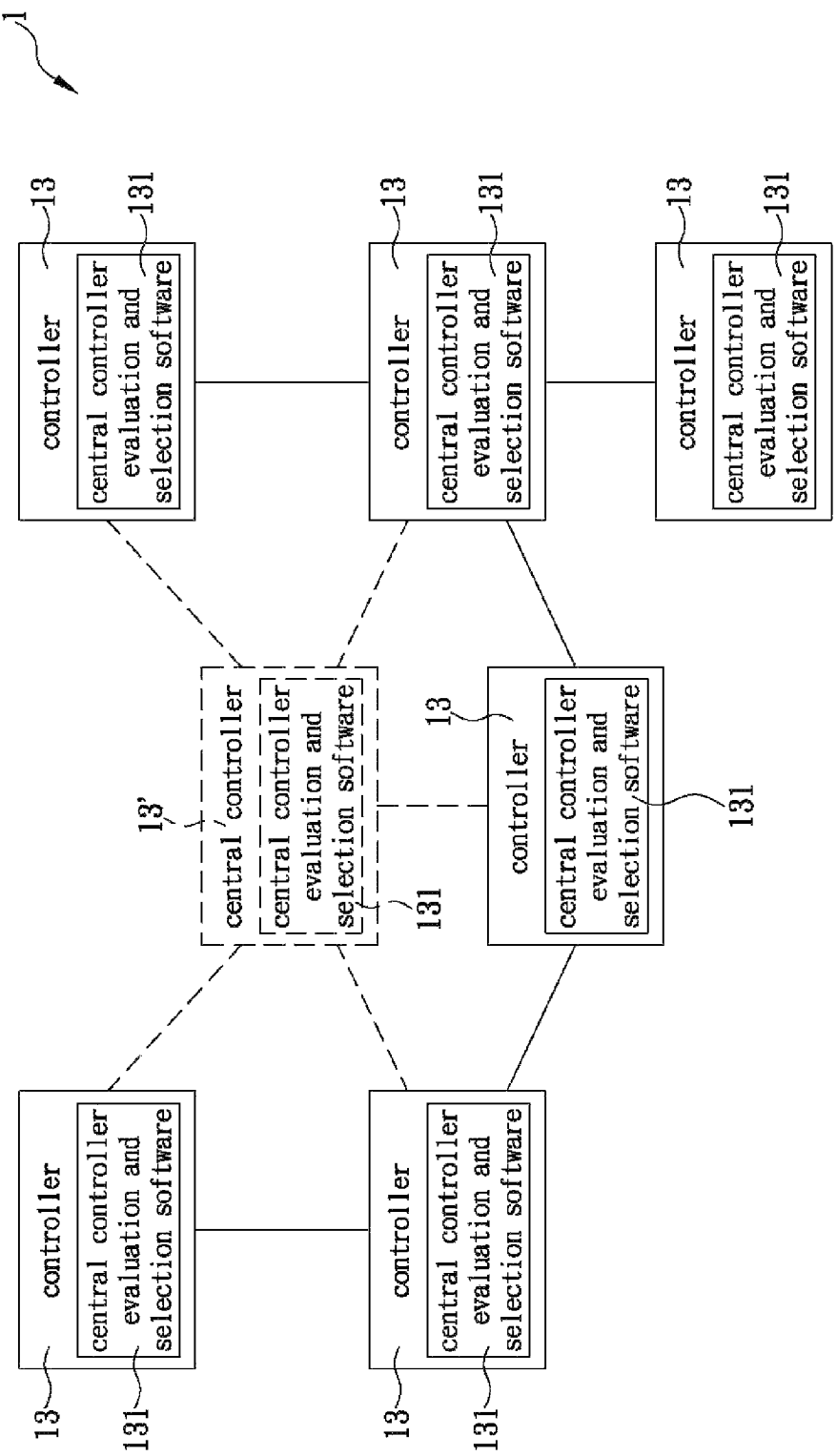
FIG. 4 schematically shows a controller being removed from the power line network of FIG. 2.

After selecting the optimal controller 13, the central controller 13' assigns the optimal controller 13 as the central controller 13' and informs all the other controllers 13 that the optimal controller 13 now functions as the central controller 13'. Hence, referring to FIG. 3, if a new controller 13 is added to the power line network 1 such that the number of nodes in the power line network 1 is changed, the central controller 13' will re-evaluate the existing controllers 13 in the power line network 1 and reselect the optimal controller 13 as the central controller 13'. Alternatively, referring to FIG. 4, if the central controller 13' is removed from the power line network 1, the remaining controllers 13 in the power line network 1 will renegotiate with one another to determine a new central controller 13', in order for the new central controller 13' to select the optimal controller 13 as the central controller 13'. The foregoing selection process can effectively ensure optimization of the performance of the power line network 1.

Referring back to FIG. 2, in order to select the controller 13 that best suits the intended use of the power line network 1 as the central controller 13', the order of priority of application of the various parameter conditions in the connected states must be adjustable. To this end, the central controller evaluation and selection software 131 in a preferred embodiment of the present invention further stores a priority sequence of the parameter conditions. Thus, if various controllers 13 are determined as respectively meeting different parameter conditions when the central controller evaluation and selection software 131 is selecting the optimal controller 13, the optimal controller 13 will be determined according to the priority sequence of the parameter conditions. Moreover, in order for the performance orientation of the power line network 1 to be adaptable to practical needs, the central controller evaluation and selection software 131 can be so designed that, when the controllers 13 receive a sequence adjustment command, the central controller evaluation and selection software 131 adjusts the priority sequence of the parameter conditions according to the sequence adjustment command. In practice, each controller 13 can be provided with an input device such as a key or a knob whereby a user can input the sequence adjustment command. Apart from that, the controllers 13 and the central controller evaluation and selection software 131 can be so configured that, when a controller 13 is connected to a terminal device 11, the controller 13 can receive a sequence adjustment command from the terminal device 11. This allows a user to send the sequence adjustment command to the controllers 13 through the terminal device 11 and thereby change the priority sequence of the parameter conditions.

To shed more light on the advantages of "dynamic adjustment of the order of priority of application of the parameter conditions", the following paragraph provides, by way of example, the parameter conditions to be respectively considered when the optimal controller 13 is to be selected as the central controller 13' according to different purposes of use of the power line network 1.

Where the power line network 1 is applied mainly to the transmission of multimedia signals to enable the viewing of high-resolution web videos, the required number of nodes is relatively low, but the required volume and stability of signal transmission are relatively high. Therefore, the parameter condition of "the data rate between each controller 13 and other controllers 13" is given the highest priority to ensure against data delay or data interruption, thereby providing a better user experience. Conversely, where the power line network 1 is applied mainly to home automation (e.g., to control the on/off, or adjust the settings, of various electrical appliances through a network), there may be the need to exercise simultaneous control over a large number of devices, so a large number of nodes is required to correspond to the number of devices to be controlled. In the meantime, however, neither intensive data transmission nor top-level transmission performance is needed. Therefore, the parameter condition of "the number of nodes which correspond to each controller 13 and are defined by the controllers 13 directly connected thereto" is given the highest priority to maximize the number of devices the power line network 1 can support (i.e., the number of devices that can be connected in the power line network 1), thereby enabling the power line network 1 to realize home automation. By the same token, the parameter condition of "the largest number of nodes each controller 13 can support" or other parameter conditions can be given the highest priority according to the major application of the power line network 1, and the mode of implementation can be optimally adjusted to suit the intended application.

It can be known from the above that the method disclosed herein for selecting the optimal central controller in a power line network not only can greatly enhance the performance of the power line network, but also can base the selection of the optimal controller on the main purpose of the power line network. This ensures that the controller best suiting the intended use of the power line network will be selected as the central controller to optimize the performance of the power line network.

While the invention herein disclosed has been described by means of specific embodiments, numerous modifications and variations could be made thereto by those skilled in the art without departing from the scope of the invention set forth in the claims.

What is claimed is:

1. A method for selecting an optimal central controller in a power line network, the method being applicable to a power line network comprising at least a terminal device, at least a network device, and a plurality of controllers, the controllers being respectively connectable to the terminal device and/or the network device, the controllers being electrically connected through at least a power line so that the controllers can communicate with one another through the power line, each said controller being installed with a central controller evaluation and selection software, the controllers negotiating with one another during formation of the power line network in order to determine a central controller, wherein the central controller can be any said controller and is able to execute the central controller evaluation and selection software, the method comprising the steps, to be performed by the central controller via the central controller evaluation and selection software, of:
    detecting and calculating connected states of the controllers in the power line network according to a plurality of parameter conditions stored in the central controller evaluation and selection software;
    selecting an optimal controller from the controllers according to the connected states thereof when it is determined that all the connected states of the optimal controller corresponding to all the parameter conditions are better than those of the other controllers, wherein the central controller evaluation and selection software further stores a priority sequence of the parameter conditions and, when it is determined that none of the controllers has all the connected states corresponding to all the parameter conditions better than those of the other controllers, the optimal controller is selected and assigned as the central controller according to the priority sequence of the parameter conditions, so as to let the central controller best suit the intended use of the power line network;

assigning the optimal controller as the central controller; and informing other said controllers that the optimal controller serves as the central controller.

2. The method of claim 1, further comprising the step, performed by the central controller upon receiving a sequence adjustment command, of adjusting the priority sequence of the parameter conditions according to the sequence adjustment command.

3. The method of claim 2, wherein each said controller is provided with at least an input device in order for a user to input the sequence adjustment command through the input devices.

4. The method of claim 3, wherein one of the parameter conditions is the largest number of nodes each said controller can support.

5. The method of claim 3, wherein one of the parameter conditions is the number of nodes which correspond to each said controller and are defined by said controllers directly connected thereto.

6. The method of claim 3, wherein one of the parameter conditions is a data rate between each said controller and other said controllers.

7. The method of claim 2, wherein each said controller is configured to receive the sequence adjustment command transmitted from the terminal device and adjust the priority sequence of the parameter conditions according to the sequence adjustment command.

8. The method of claim 7, wherein one of the parameter conditions is the largest number of nodes each said controller can support.

9. The method of claim 7, wherein one of the parameter conditions is the number of nodes which correspond to each said controller and are defined by said controllers directly connected thereto.

10. The method of claim 7, wherein one of the parameter conditions is a data rate between each said controller and other said controllers.

\* \* \* \* \*